July 19, 1960 W. J. McINTYRE 2,945,474
ANIMAL SCRATCHER AND OILER
Filed Jan. 23, 1959
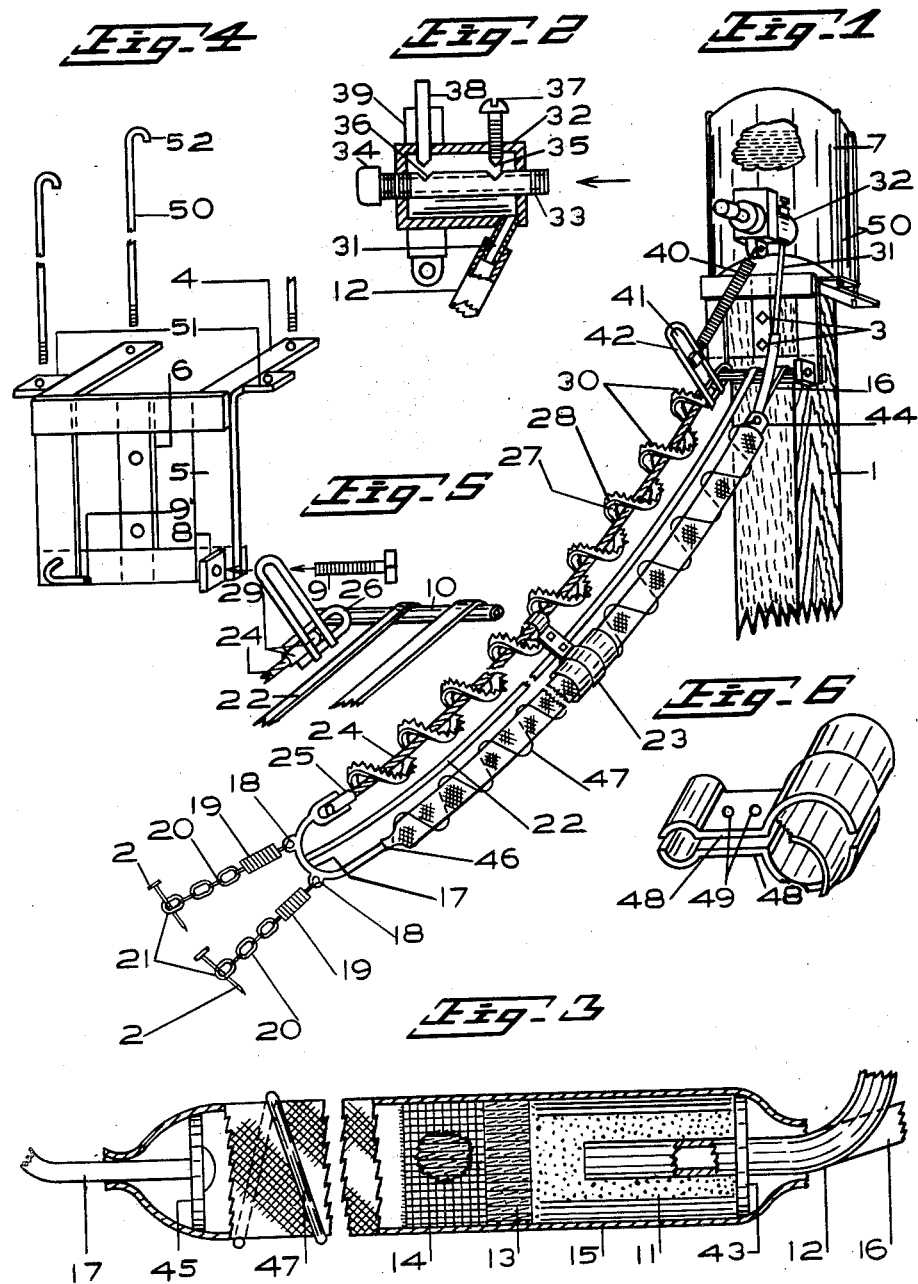
INVENTOR.
William John McIntyre
Per L. S. Mitchell
Attorney

United States Patent Office 2,945,474
Patented July 19, 1960

2,945,474
ANIMAL SCRATCHER AND OILER

William John McIntyre, Swift Current, Saskatchewan, Canada

Filed Jan. 23, 1959, Ser. No. 788,697

5 Claims. (Cl. 119—157)

This invention relates to animal scratchers and oilers, more particularly for use by cattle and hogs.

In the art to which the invention relates animal scratchers and oilers more usually combine the scratching and oiling elements in a single body suspended between a post and a stake in the ground, and in this the scratcher more usually consists of a chain or the like wound about the oiler sock. In such a device the scratching element is an integral part of the oiler, which may result in considerable wear on the outer covering of the oiler sock by the animal rubbing against it while scratching.

The present invention contemplates improvements in devices of this character by provision of three separate elements, an oiler sock, a stiffening bar for the oiler sock and a scratcher, and including improvements in the oiler sock construction and in the scratcher. It also includes an improved oil control by which a regulated oil drip is provided delivering to the oiler sock, and this is augmented by a further supply, the control for which further supply is actuated by the animal while using the scratcher.

The above and other improvements will be set out in detail in the accompanying description, having reference to the drawings in which, Fig. 1 is a side elevation in perspective of an animal scratcher and oiler in accordance with my invention, shown suspended between a post and a stake driven into the ground.

Fig. 2 is a detail enlarged view, partly in section, of the oil control valves and sediment casing, and including a drip spout hose for connection of the oiler sock.

Fig. 3 is a detail enlarged view of a fragment of the oiler sock, including the oil connecting pipe and attaching strip for the sock, shown broken away in part and partly in section.

Fig. 4 is a perspective view of a bracket for mounting the oil container on a post and for attachment of the oiler sock and stiffener bar and scratcher, and including the bolt for attachment of these elements.

Fig. 5 is a detail perspective of the pipe for attachment of the oiler sock and stiffener bar and scratcher to the post bracket, including fragments of these elements and the arm for actuation of one of the oil outlets.

Fig. 6 is an enlarged perspective view of the bracket clamp.

Having reference to the drawings the scratcher and oiler are to be mounted suspended between an upright post 1 and stakes 2 driven into the ground.

On the top of the post, attached by screws 3, is an angular bracket as illustrated in Figure 4 and providing horizontal and vertical wings 4 and 5 and a reinforcing bar 6. On the horizontal wings 4 is supported an oil container 7, preferably having a capacity of five gallons, the oil for which would be treated chemically as is common in the art. The lower end of one of the depending wings 5 has a bent pin 9' fixed thereto and on which is a pipe section 10 free to turn and supported at the other end by a bolt 9 threaded in a nut 8 on the wing 5.

The wings 5 further include lugs 51, one to each, in which and the ends of the wings may be threaded rods 50, these rods having bent ends 52 engageable to anchor the container on the wings 4.

The oiler sock consists of a strip or strips of sponge rubber 11 forming the core and with which would be included porous fabrics such as twine, waste or old rags, designed to soak up and hold the treated oil. The use of sponge rubber by itself would be best, its greater cost being justified in view of its oil holding capacity, and it further requires to be squeezed to extract the oil.

Where the filler is only partly of rubber this would be at the upper end of the sock embracing a metal oil inlet tube 12. The filler for the sock may be enclosed in a twine or like fabric binding 13 over which is a wire mesh cover 14 and an outer cover of canvas 15, or any other suitable cover could be used through which the treated oil could be readily extruded, such as fiber glass netting, nylon or plastic netting, or any material that is strong and durable yet porous enough to let the oil through to the animal. Essentially the enclosure for the oil is designed to facilitate the escape of the oil as it is squeezed from the sock by an animal rubbing against it. A spiral rod 47 may be wound around the sock for protection against wear and as an added scratching element. This rod is secured at the ends to the binding ferrules 44 and 46.

For attachment of the oiler sock to the pipe 10 a metal strip 16 is welded to the pipe at one end and the other end welded to the inlet tube 12. The tube includes a washer 43 fixed to it, as by welding, and the end of the sock is drawn over the washer and secured about the tube by a binding ferrule or clamp 44.

The lower end of the oiler sock is attached to one end of a two armed bracket 17 drawn over a washer 45 on the bracket arm and secured by a binding ferrule or clamp 46. The bracket 17 has eyes 18 engaged by springs 19 secured to chains 20, the chains having a bar 21 engaging the stakes 2. The springs are adapted to impart flexibility to the unit as a whole and the use of two chains engaging separate stakes prevents the oiler unit from twisting and becoming damaged.

For supporting the oiler sock I provide a stiffener rod 22 welded at the ends to the bracket 17 and pipe 10, and to which rod the oiler sock is attached by a bracket clamp 23 consisting of mating halves 48 connected by bolts 49.

The scratching element consists of a woven wire cable 24 having a ferrule 25 fixed to the lower end, this ferrule having a fixed attachment, as by welding, to the bracket 17. The other end of the cable 24 has a ferrule 29 attaching to the pipe 10 by a U clamp 26 welded to the ferrule and pipe.

The cable 24 has an iron band 27 spirally wound about it, this band being oversize of the cable leaving a space of about half an inch all around between the band and cable. The band is fixed at the ends to the ferrules 25 and 29. On the band is an outwardly projecting scratching element consisting of a thin flat metal strip 28 fixed by welding to the band 27 and provided with fine serrated edge 30. Use by the animals imparts a springing action to the iron band that tends to kick out excess collected hair, moisture, snow, ice and other matter.

The oil for the sock is carried from the container 7 by a hose pipe 31 leading to the oil inlet tube 12 from a sediment casing 32 attached to the container. In the casing 32 is a tubular valve body 33 threaded in the container and supplied with a cap 34 threaded on the outer end and to be removable for cleaning the valve body.

Oil from the container passes through the valve body and discharges through two outlet openings 35 and 36 into the casing 32 for delivery through the hose pipe 31 to the oiler sock by way of the pipe 12. Sediment from the oil accumulates in the valve body, the oil flow being upward through the outlets 35 and 36. The outer casing 32 keeps out dirt and directs the oil drip to the pipe 31.

Control of the flow of oil through the valve body outlet 35 is by a stem 37 threaded in the casing 32 and adapted for seating in the outlet, the stem being adjustable to control the oil flow through this outlet.

The flow of oil through the outlet 36 in the valve body is controlled by a stem 38 adapted to close the outlet. This stem is carried on a lifter bracket 39 that is engaged by a coiled spring 40 attaching at the lower end free to slide in the slideway 41 of an arm 42 fixed to the upper ferrule 29.

In the use of the device, oil from the container 7 passes through the valve body 33 discharging through one or both of the outlets 35 and 36 into the casing 32 and down the tube 31 and inlet tube 12 to the sock. The drip from the outlet 35 would be from five to ten drops a minute.

Additional oil would also be supplied, this coming from the outlet 36. When the scratcher is rubbed by an animal the arm 42 is agitated and this, through the spring 40, moves the bracket 39 up and down, allowing more oil to discharge. By this means extra oil is supplied to the sock in accordance with the use of the scratcher by the animals. Either or both outlets may be used as desired, or the two outlets could correspond and both be operated by the animal.

The device is for use with cattle or hogs and is designed to obtain the greatest possible value from its use. The scratcher with its toothed edge obtains a grooming and currying effect, opening up the pores so the treated oil can penetrate enough to kill the warble flies imbedded under the skin. The teeth as herein provided do not tear the side of the animal, but yet act to loosen up the scale and dead layers of tissue. Additionally the springs 19 permit the unit to bend about the animal's back.

While I have herein disclosed a preferred embodiment of my invention it is obvious changes would readily suggest themselves, but in so far as such changes come within the spirit and scope of the invention as defined in the appended claims they would be considered a part hereof.

Having thus particularly described and ascertained the nature of my said invention, what I claim and wish to secure by Letters Patent is:

1. An animal oiler and scratcher for suspension between a post and stakes driven into the ground, said oiler and scratcher including a bracket fixed to the post, a further bracket and means attaching the further bracket to the stakes, a stiffener bar suspended between the brackets, an oiler sock suspended between the brackets separate from the stiffener bar, a scratcher suspended between the brackets separate from the oiler sock and stiffener bar, said scratcher consisting of a cable and a scratching element wound on the cable, a clamp securing the scratcher cable and oiler sock to the stiffener bar, an oil container on the post bracket, a valve casing attached to the container, said casing having a tubular connection for delivery of oil to the sock, a valve body in the casing connected to receive oil from the container, said valve body having two outlets discharging into the casing, a manually operable valve stem controlling the flow of oil from the one valve body outlet, a further valve stem, a bracket in which the further valve stem is carried, an arm on the scratching cable, and spring means between said arm and bracket adapted to normally hold said valve stem seated in the other valve body outlet.

2. In an animal oiler and scratcher embodying an oiler sock and scratcher and including an oil container, an oil casing fixed to the container, means connecting the oil casing for delivery of oil therefrom to the sock, a valve body in said connecting means receiving oil from the container, said valve body having one or more outlets, valve stems for said outlets, a lifter bracket on the oil casing in which one of the valve stems is carried, an arm on the animal scratcher, and a coiled spring attached to the lifter bracket and slidingly connected to the arm, said spring normally holding the bracket with the valve stem carried thereby seated in a valve body outlet.

3. In an animal oiler and scratcher for suspension between a post and stakes driven into the ground, said oiler and scratcher embodying an oiler sock and a scratching cable with scratching element on the cable, an oil container for mounting on the post, an oil casing attached to the container, said casing having a connection for delivery of oil to the sock, a tubular valve body in the casing attached to the container and through which oil from the container is delivered, said valve body having an oil outlet, a bracket on the casing, a valve stem carried by the bracket, and means forming a connection between the scratcher cable and bracket for agitation of the bracket by the cable, said means including a spring normally holding the bracket with the valve stem seated in the valve body outlet.

4. An animal oiler and scratcher as set out in claim 3 and including brackets attached to the post and stakes and to which brackets the oiler sock and scratcher are attached, a stiffener bar between the stakes and post and between the oiler sock and scratcher, and means for attachment of the oiler sock and cable to the stiffener bar.

5. An animal oiler and scratcher as set out in claim 3 and including a metal band spirally wound about the scratcher cable, and a metal strip fixed to the band lengthwise thereof projecting outward, said strip having a fine serrated edge.

References Cited in the file of this patent

UNITED STATES PATENTS

| | | |
|---|---|---|
| 273,245 | Bate | Mar. 6, 1883 |
| 1,291,367 | Barhite | Jan. 14, 1919 |
| 1,543,601 | Clements | June 23, 1925 |
| 2,669,969 | Rasmussen | Feb. 23, 1954 |
| 2,688,950 | McKinley | Sept. 14, 1954 |
| 2,690,162 | Kremer | Sept. 28, 1954 |
| 2,766,726 | Duff | Oct. 16, 1956 |